(12) United States Patent
King et al.

(10) Patent No.: US 11,725,609 B2
(45) Date of Patent: Aug. 15, 2023

(54) PASSIVE INFRARED REDUCTION DEVICE

(71) Applicant: The Boeing Company, Chicago, IL (US)

(72) Inventors: Carl King, Mesa, AZ (US); Kal V. Geiler, Mesa, AZ (US)

(73) Assignee: THE BOEING COMPANY, Chicago, IL (US)

(*) Notice: Subject to any disclaimer, the term of this patent is extended or adjusted under 35 U.S.C. 154(b) by 840 days.

(21) Appl. No.: 16/705,623

(22) Filed: Dec. 6, 2019

(65) Prior Publication Data

US 2021/0254582 A1    Aug. 19, 2021

(51) Int. Cl.
*F02K 1/82* (2006.01)
*G01J 5/06* (2022.01)

(52) U.S. Cl.
CPC .............. *F02K 1/825* (2013.01); *G01J 5/06* (2013.01); *G01J 2005/065* (2013.01)

(58) Field of Classification Search
CPC ....... F02K 1/825; G01J 5/06; G01J 2005/065; B64D 33/04; B64D 2033/045; F05D 2220/329
See application file for complete search history.

(56) References Cited

U.S. PATENT DOCUMENTS

| | | | | |
|---|---|---|---|---|
| 5,746,047 A | * | 5/1998 | Steyer | F02K 1/825 239/265.17 |
| 7,313,909 B2 | * | 1/2008 | Skoog | C23C 24/08 60/39.5 |
| 2014/0084080 A1 | * | 3/2014 | Robertson | F02K 1/825 239/127.3 |

* cited by examiner

*Primary Examiner* — David P Porta
*Assistant Examiner* — Meenakshi S Sahu
(74) *Attorney, Agent, or Firm* — Gates & Cooper LLP

(57) ABSTRACT

A line of sight blocker including a cover defining a duct bounded by the cover and a heated surface when the cover is fastened over the heated surface. The cover blocks transmission of infrared radiation emitted from the heated surface; the cover comprises a material having a lower thermal conductivity than the heated surface; and the duct comprises a vent and a path for latent heat from the heated surface to escape through the vent.

20 Claims, 8 Drawing Sheets

PASSIVE INFRARED REDUCTION DEVICE

BACKGROUND

1. Field

The present disclosure relates to systems and methods for reducing an infrared signature.

2. Description of the Related Art

Infrared emissions from aircraft, ships, tanks, other vehicles and structures, and the like provide an "infrared signature" that generally increases as the temperature of the components and exhausts of those devices increase. Excessive infrared emissions can make the aircraft more easily detectable to infrared detection equipment, which can also use the infrared signature to identify the aircraft. Current infra-red reduction technology is implemented in the early design phase and handled at the system level for large heat sources such as engines that can operate at temperatures in excess of 1000 degrees. What is needed is a cost effective and lightweight solution for suppressing smaller infrared signatures. The present disclosure satisfies this need.

SUMMARY

The present disclosure describes a line of sight blocker. The line of sight blocker is embodied in many ways including, but not limited to, the following.

1. A blocker comprising a cover defining a duct bounded by the cover and a heated surface when the cover is fastened over the heated surface, wherein the cover blocks transmission of infrared radiation emitted from the heated surface; the cover comprises a material having a lower thermal conductivity than the heated surface; and the duct comprises a vent and a path for latent heat from the heated surface to escape through the vent.

2. The blocker of example 1, wherein the duct comprises air forming an insulation layer.

3. The blocker of example 1, further comprising:
 a part extending outward from a first sidewall, wherein:
 the cover comprises the first sidewall and a second sidewall; and
 the part has a length defining a width of the duct, the width comprising a spacing between the first sidewall and the heated surface when the sidewall is facing the heated surface and the part is physically connected to the heated surface.

4. The blocker of example 3, wherein the duct has the width (W) wherein ⅜ inch≤W≤1 inch.

5. The blocker of claim 3, wherein the duct has the width allowing flow of air into the duct through natural convection.

6. The blocker of example 3, wherein the cover includes the part comprising a top wall, a flange, a lip, a rim, or an arm.

7. The blocker of example 6, wherein the top wall includes a plurality of holes allowing flow of air out of the duct.

8. The blocker of example 1, wherein the cover is conformal with the heated surface.

9. The blocker of example 1, wherein the cover has a first circular cross-section or a cross-section including a segment of a circle (e.g., the cover comprises a half cylinder), the heated surface has a second circular cross section, and the cover is co-axial with the heated surface when the cover is fastened over the heated surface.

10. The blocker of example 1, wherein the cover is conformal with the heated surface and defines the duct when fastened to a device:
 including an engine drain line having the heated surface,
 a hydraulic line having the heated surface, or
 a screen on a device vent having the heated surface.

11. The blocker of example 1, wherein the cover is conformal with the heated surface and defines the duct when fastened:
 to an electronic circuit including the heated surface, or
 a box housing the electronic circuit and the box includes the heated surface.

12. The blocker of example 1, wherein the cover defines the duct when fastened to a housing including bearings, the housing including the heated surface.

13. An apparatus, comprising:
 a device including a heated surface emitting infrared radiation when the device is in operation;
 a cover disposed over the heated surface; and
 a gap between the cover and the heated surface, wherein the gap comprises a path for latent heat from the heated surface to escape from between the cover and the heated surface.

14. The device of example 13, further comprising a fan coupled to the gap, the fan blowing cooling air into the gap.

15. The device of example 13, wherein the cover is retrofittably disposed over the heated surface.

16. The device of example 13, wherein the cover is conformal with the heated surface and defines a duct when fastened to the device including:
 an engine drain line having the heated surface,
 a hydraulic line having the heated surface,
 an electronic circuit including the heated surface, or
 a box housing the electronic circuit and the box includes the heated surface.

17. The device of example 13, wherein the device comprises a first surface and a second surface, the second surface frictionally engaging the first surface during the operation so as to heat the first surface into the heated surface through friction.

18. The device of example 13, further comprising a duct bounded by the cover and the heated surface, the duct having the gap at a first end of the cover and a second opening at a second end of the cover, wherein the path through the duct is perpendicular to a line of sight through the cover to the heated surface.

19. The device of example 13, wherein:
 the apparatus comprises a de-rotation unit including an inner can, an outer can, and bearings between the inner can and the outer can,
 wherein:
 the bearings rotate so as to decouple a rotation of the inner can from the outer can when the outer can is coupled to a stand pipe and the stand pipe is coupled to a fixed point on an airframe, so that one or more components mounted on the outer can do not rotate with the inner can;
 the de-rotation unit further includes seals sealing lubricant within a space between the inner can and the outer can; and
 the de-rotation unit includes the heated surface emitting infrared radiation when the de-rotation unit is decoupling rotation of the outer can from the rotation of the inner can with a drive shaft driving a plurality of rotors on a helicopter having the airframe.

20. An apparatus, comprising:

a shroud that removably and retrofittably couples to a mast, wherein the shroud is sized and shaped to draw air in a gap between the shroud and the mast, and the gap forms an insulation layer and provides a path for latent heat from the mast to escape.

BRIEF DESCRIPTION OF THE DRAWINGS

FIG. 2A and FIG. 2B illustrate a line of sight blocker according to a second example, including a cover mounted on a line, wherein FIG. 2A illustrates the line of sight blocker comprising a cylinder around the heated surface on the line, and FIG. 2B illustrates the line of sight blocker comprising a half cylinder around half the heated surface on the line.

FIGS. 6A-6D illustrate a line of sight blocker according to a sixth example, wherein FIG. 6A illustrates the line of sight blocker mounted on a helicopter, FIG. 6B is a cross-sectional view of the line of sight blocker mounted on a de-rotation unit, FIG. 6C is a three dimensional cross-sectional view of FIG. 6B, and FIG. 6D illustrates the line of sight blocker surrounding the heated surface of the de-rotation unit.

DESCRIPTION

In the following description, reference is made to the accompanying drawings which form a part hereof, and which is shown, by way of illustration, several examples. It is understood that other examples may be utilized and structural changes may be made without departing from the scope of the present disclosure.

Technical Description

Many electronic systems, hydraulic systems, or mechanical systems heat up during operation. Example mechanical systems (such as bearing units) comprise a first surface and a second surface, wherein the second surface frictionally engages the first surface during operation so as to heat the first surface into a heated surface through friction. Example hydraulic devices comprise pipes or lines conveying a fluid flow that frictionally engages the surface of the pipe so as to heat the surface of the pipe into a heated surface through friction. In other examples, the surface of the pipe is heated into a heated surface through thermal contact with a hot fluid flowing in the pipe. Example electronic devices include circuits that heat up when current is passed through the circuit.

The present disclosure describes a Line Of Sight (LOS) blocker for reducing the infra-red signature of a system. The blocker covers a warm area or heated surface from view with a material that has a low heat conductivity. The blocker is arranged such that a sufficient gap is left between the blocker and the warm area or the heated surface. This gap forms an insulating layer to the blocker and ensures there is a path for latent heat to escape. Cooling flow in the air gap can be powered by natural and/or forced convection.

First Example

Figure 1:
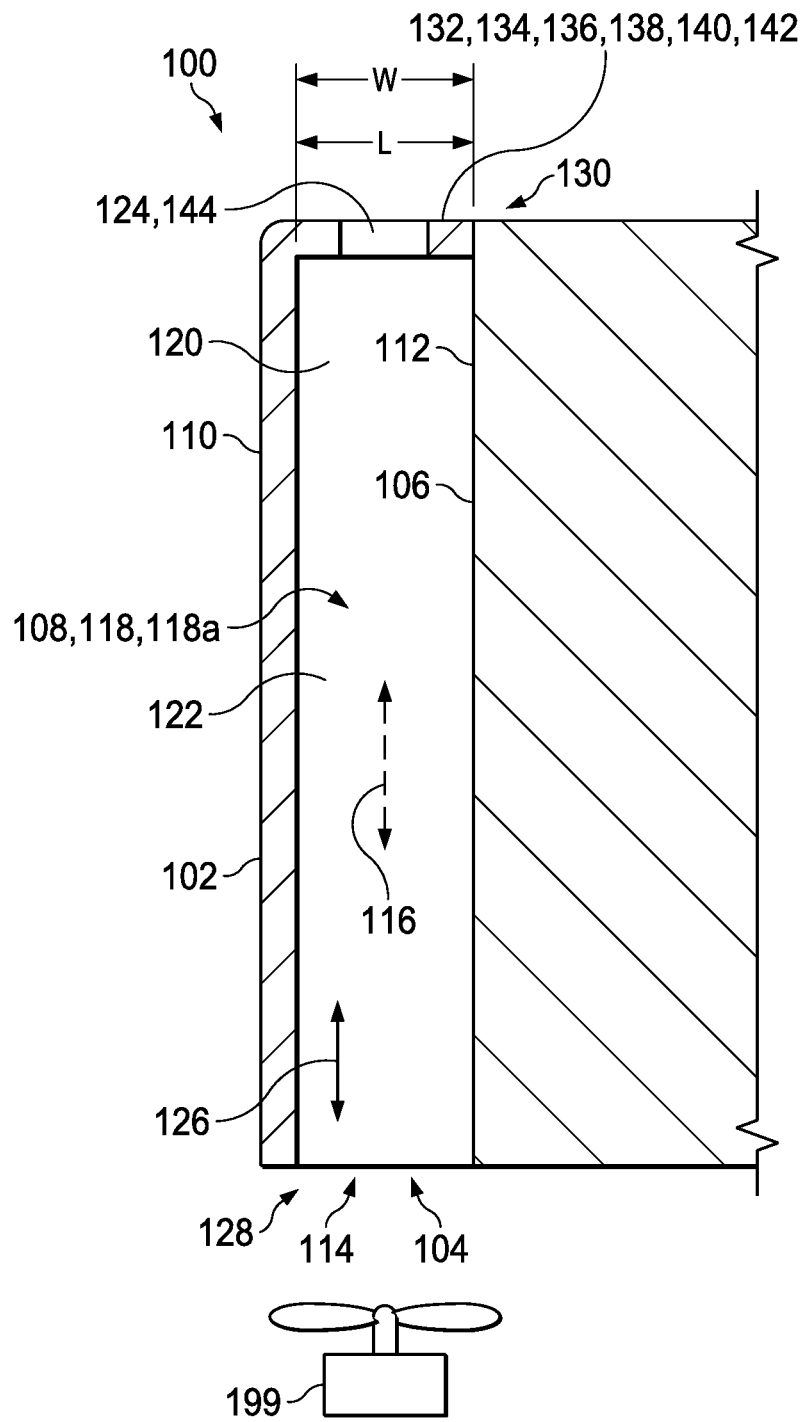
FIG. 1 illustrates a line of sight blocker according to a first example.

FIG. 1 illustrates a line of sight blocker 100 comprising a cover 102 having a size and shape configured to define a duct 104 bounded by the cover and a heated surface 106 when the cover is fastened over the heated surface. The cover comprises one or more materials (1) having a lower thermal conductivity than the heated surface and (2) having optical properties (e.g., reflectivity, transmittivity, and absorption coefficient) blocking transmission of infrared radiation 108 emitted from the heated surface. Example materials include plastic, (e.g., polyetherimide), or carbon fiber materials. The duct 104 comprises a first sidewall 110, a second sidewall 112 comprising the heated surface, and a first opening comprising a vent 114. In this way, the duct forms a path 116 for heat 118 (e.g., latent heat 118*a*) from the heated surface to escape through the vent. In one example, the duct comprises air 120 forming an insulation layer 122 insulating the cover from the heated surface. In one or more examples, the cover is configured to include a second vent 124 at a second end of the cover to allow flow 126 of air (e.g., natural convection) through the duct from a first side 128 to a second side 130. The vent does not have to be in the second end. In other examples, the vent is placed near or adjacent the second end in the first sidewall 110.

FIG. 1 illustrates the cover comprises the first sidewall of the duct and a part 132 extending outwardly from the first sidewall. The part (integral with the cover or attached to the cover) has a length L defining a width W of the duct. In one or more non limiting examples, the part comprises a top wall 134, a flange 136, a lip 138, a rim 140, or an arm 142. In one or more examples the top wall, the flange, the lip, or the rim include a plurality of holes 144 or openings allowing flow 126 of air out of the duct.

The width comprises a spacing (e.g., perpendicular distance) between the first sidewall and the second sidewall when the part is physically connected to the heated surface (or a mount for the heated surface) so as to secure the cover in place with the first sidewall facing the second sidewall. In one or more examples, the duct has the width W allowing air flow into the duct through natural convection and is tailored depending on the heat load generated by the heated surface. Examples include, but are not limited to, the duct having the width W wherein ⅜ inch 1 inch. FIG. 1 further illustrates an optional fan 199 used or blowing flow 126 of the air 120 into the vent 114.

Second Example

Figure 2A:
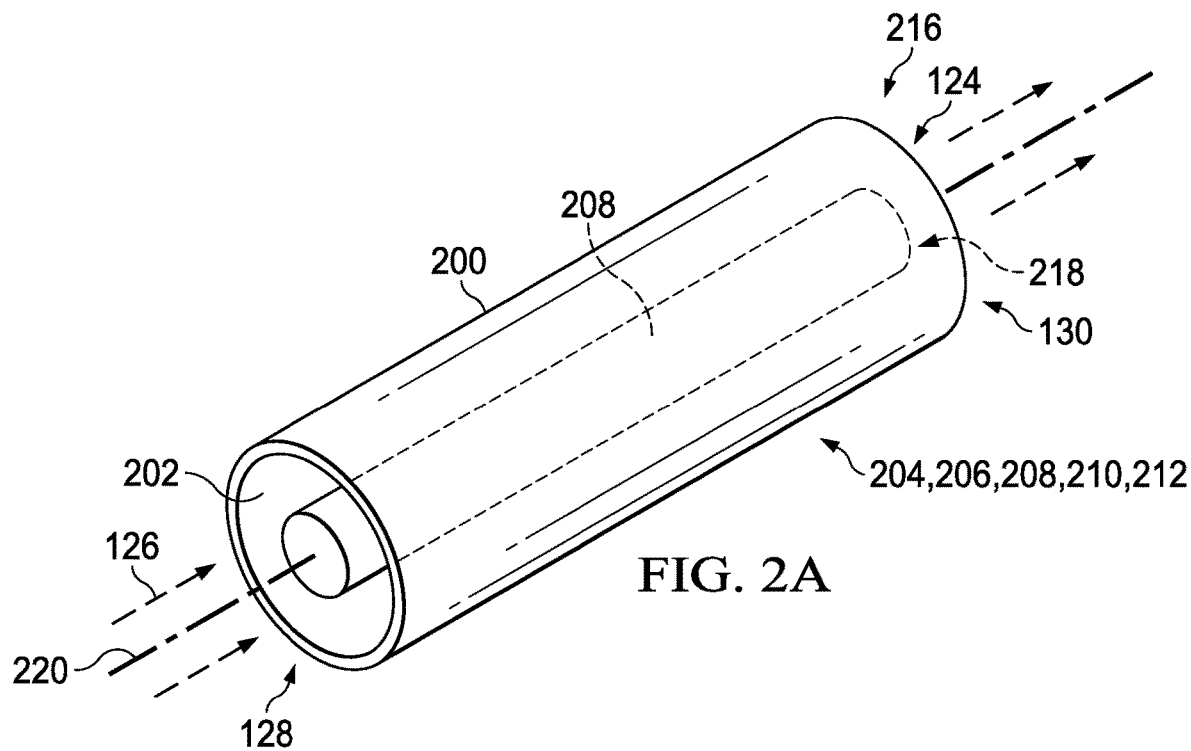
Figure 2B:
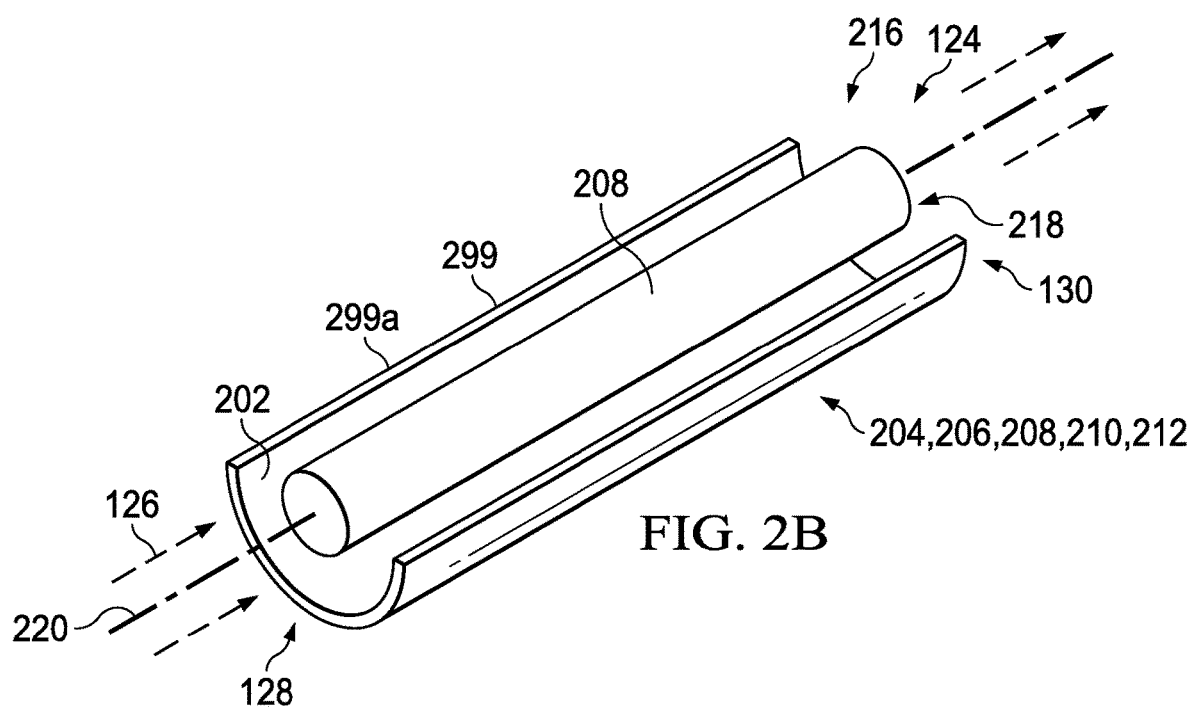

FIG. 2A illustrates the cover 200 defining a duct 202 when fastened to a device 204 including a line 206 (e.g., pipe or conduit) having the heated surface 208. Examples include, but are not limited to, the line 206 comprising a hydraulic line 210 or an engine drain line 212. The cover 200 is conformal with the heated surface 208. Examples include, but are not limited to, the cover 200 having a first circular cross-section 216, the heated surface 208 having a second circular cross section 218, and wherein the cover 200 is co-axial (sharing axis 220) with the heated surface when the cover is fastened over the heated surface 208. FIG. 2B illustrates an example wherein the cover 200 comprises a half cylinder 299 to effectively block emissions about half of the heated surface 208.

As described above, the cover 200 is configured to include a vent 124 to allow flow 126 of air 120 (e.g., natural convection) through the duct 202 from a first side 128 to the second side 130.

Third Example

Figure 3:
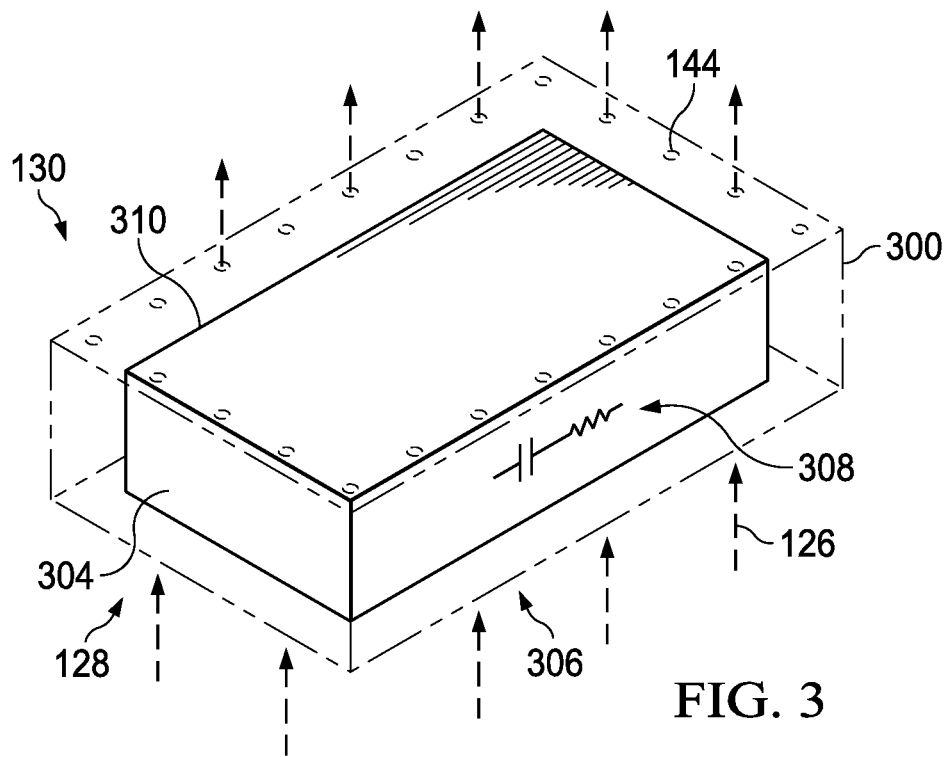
FIG. 3 illustrates a line of sight blocker according to a third example, including a cover mounted on a box.

FIG. 3 illustrates an example wherein the cover 300 is conformal with the heated surface 304 and defines a duct 306 when fastened to an electronic circuit 308 including the heated surface, or when fastened to a box 310 housing the electronic circuit (in which case the box includes the heated surface 304). In addition, the cover 300 is configured to include a vent (e.g., holes 144) to allow flow 126 of air 120 (e.g., natural convection) through the duct 306 from a first side 128 to the second side 130.

Fourth Example

Figure 4:
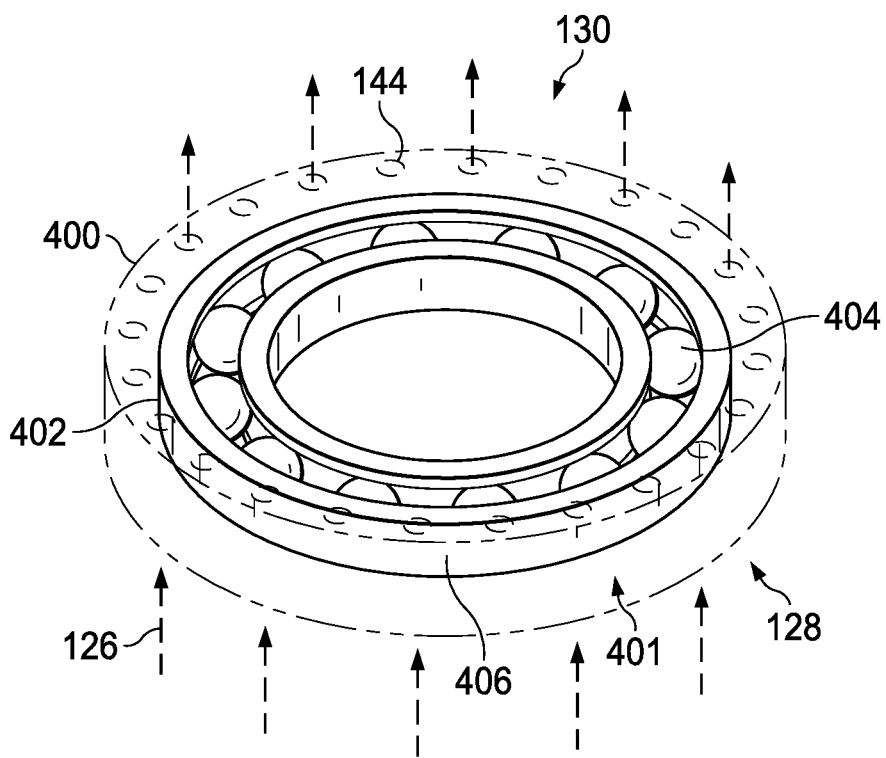
FIG. 4 illustrates a line of sight blocker according to a fourth example, including a cover mounted on a bearing unit.

FIG. 4 illustrates an example wherein the cover 400 defines the duct when fastened to a bearing unit 401 comprising a housing 402 including bearings 404 wherein the housing includes the heated surface 406. In addition, the cover 400 is configured to include a vent (e.g., holes 144) to allow flow 126 of air 120 (e.g., natural convection) through the duct from a first side 128 to the second side 130.

Fifth Example

Figure 5:
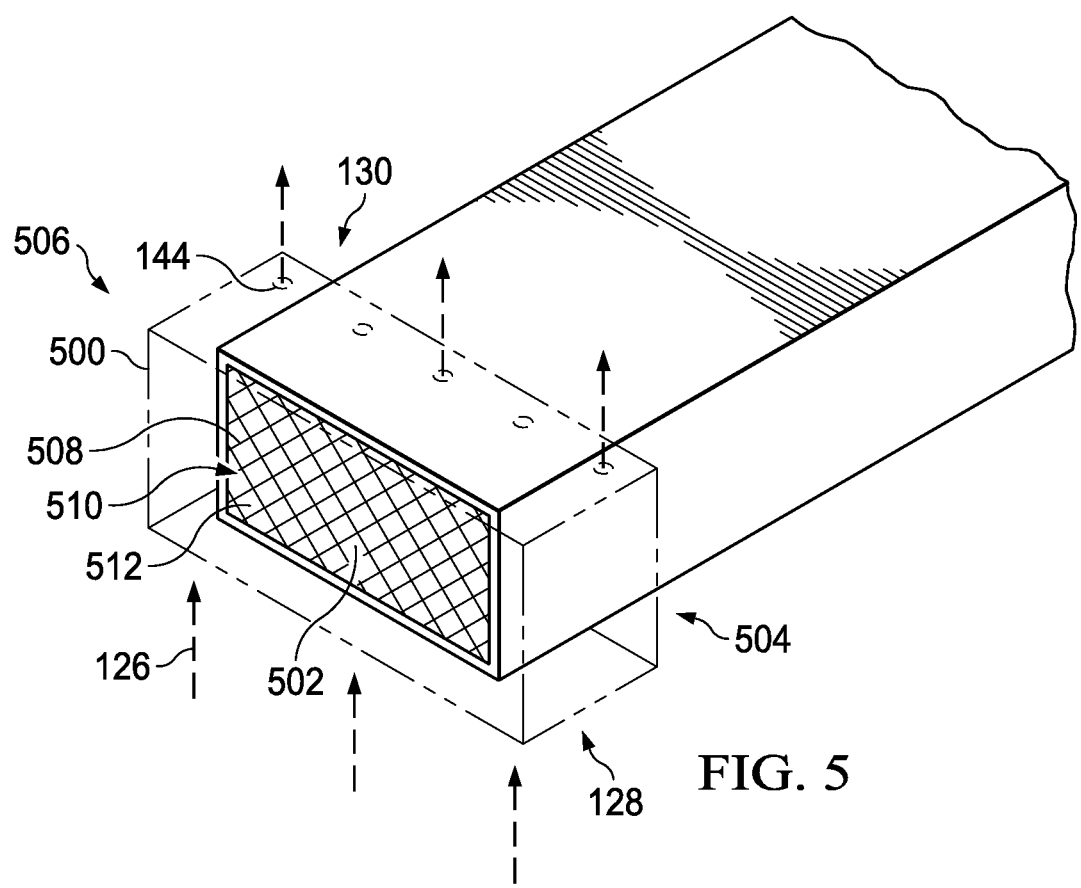
FIG. 5 illustrates a line of sight blocker according to a fifth example, including a cover mounted on a screen on a vent opening.
Figure 6A:
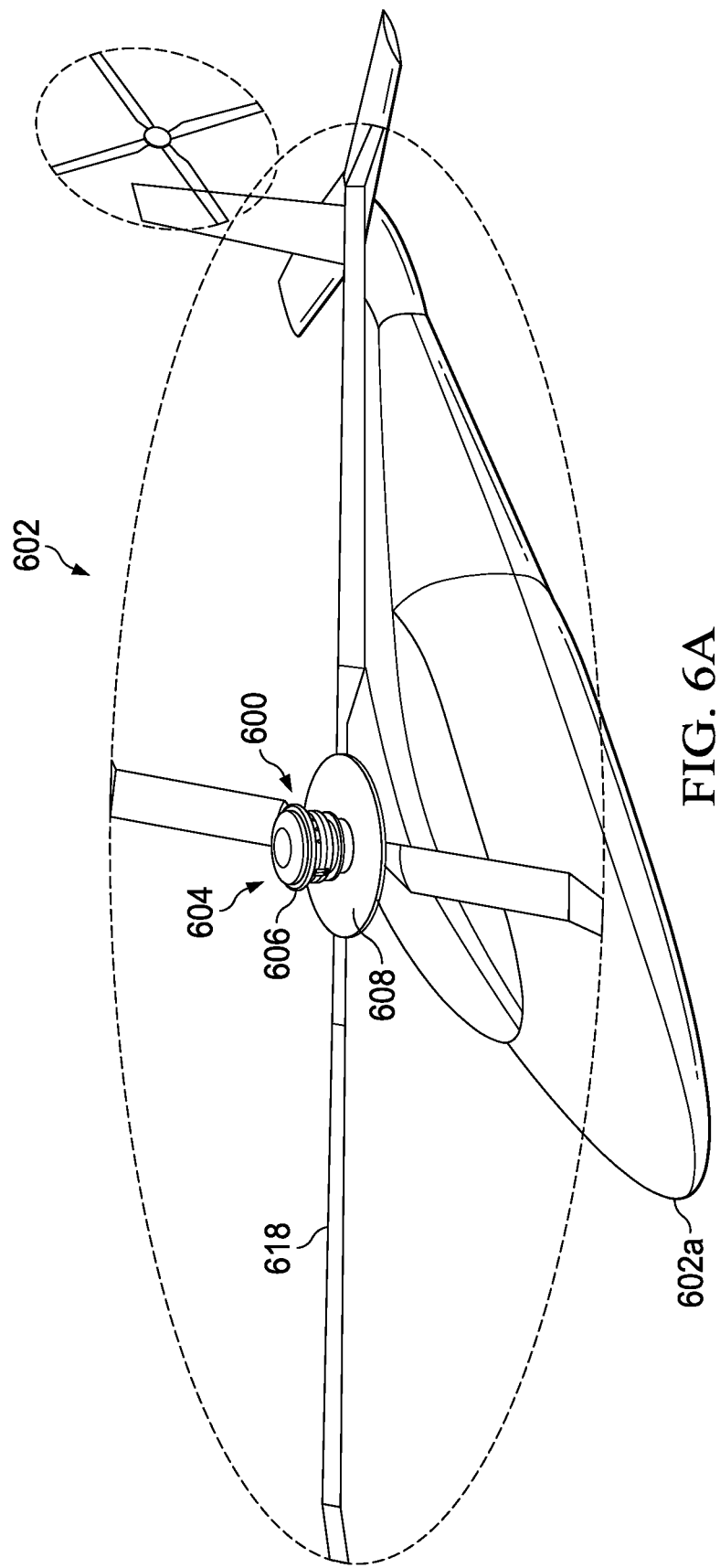
Figure 6B:
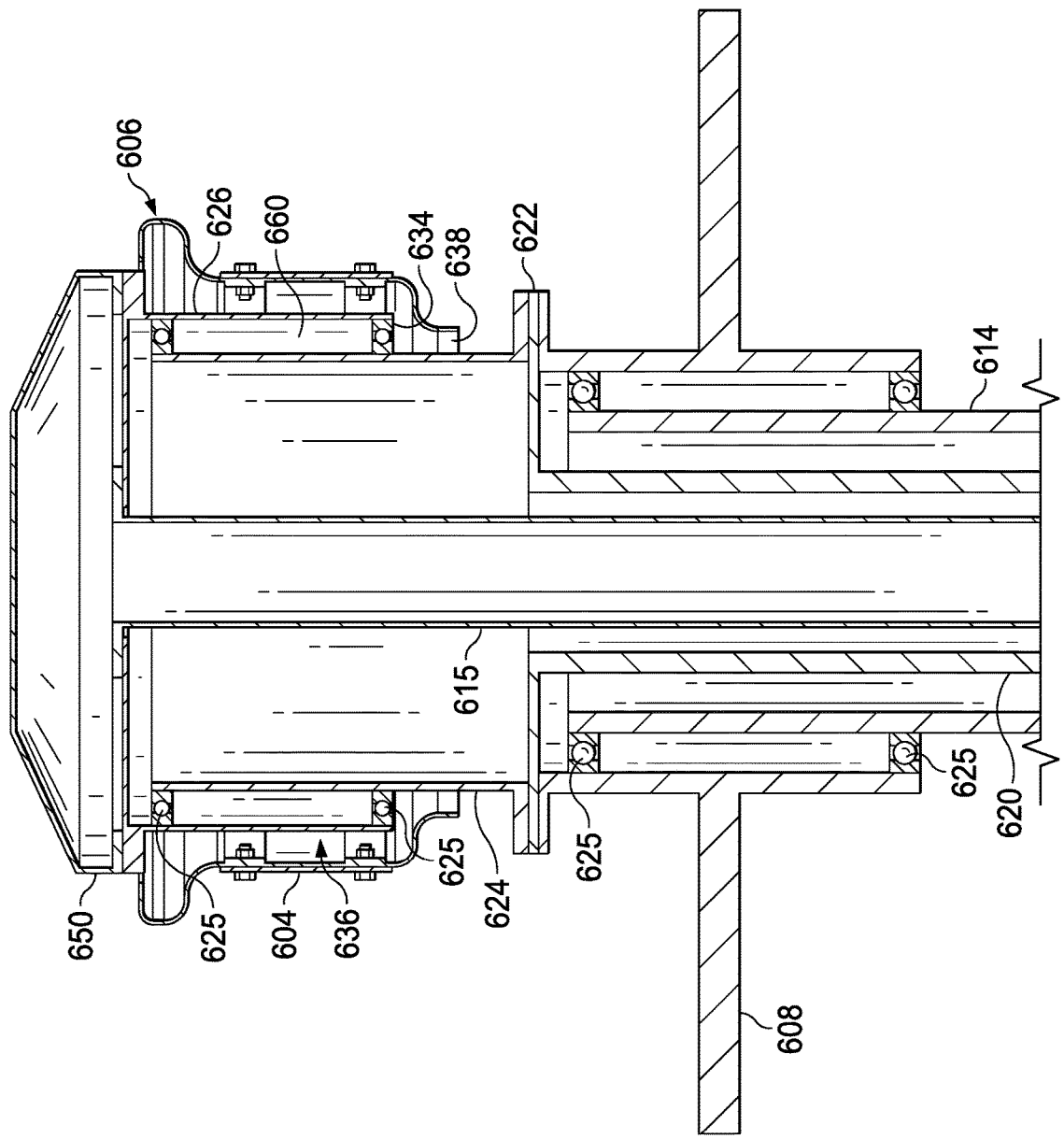
Figure 6C:
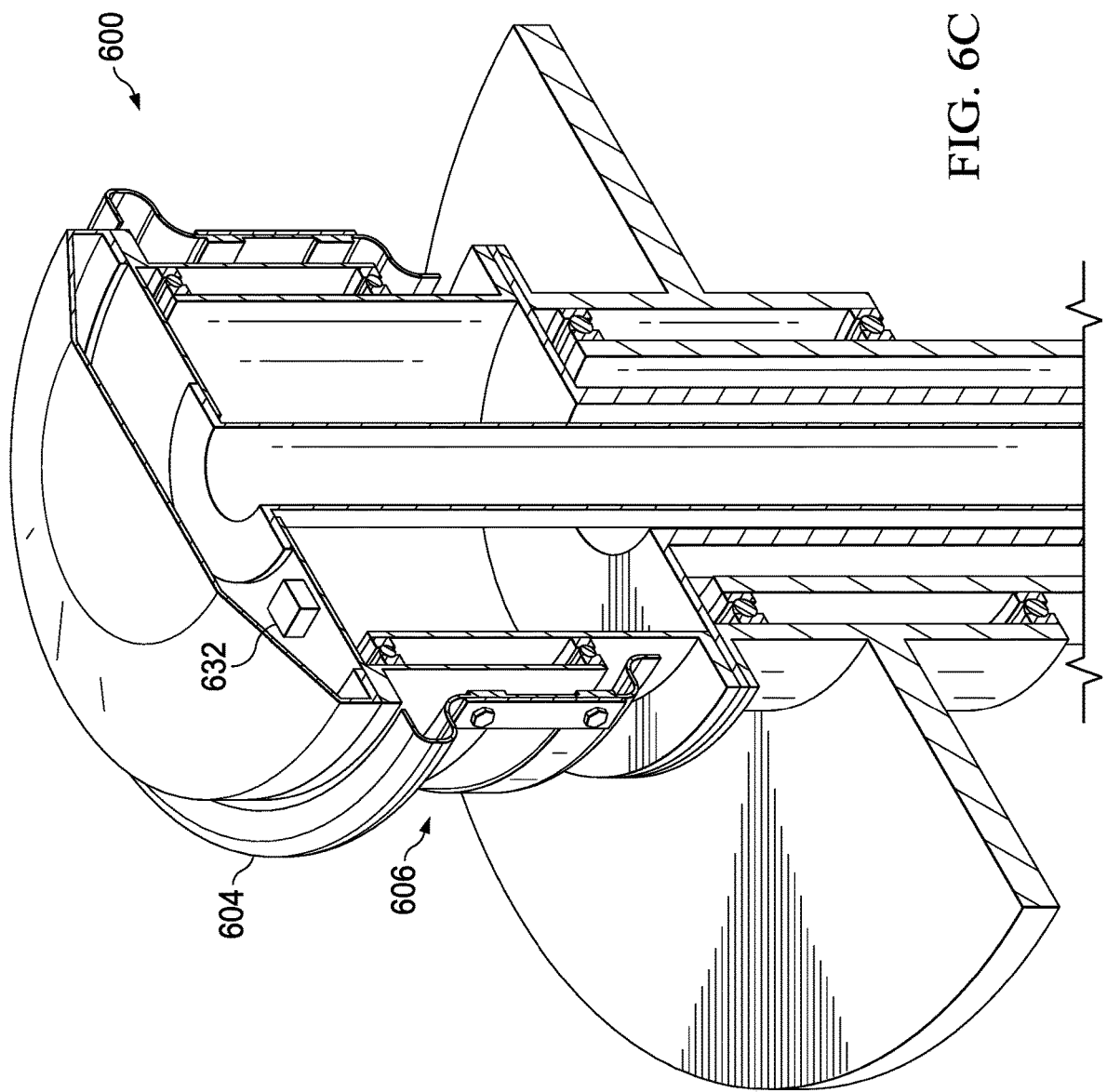

FIG. 5 illustrates an example wherein the cover 500 is conformal with the heated surface 502 and defines the duct 504 when fastened to a device 506 including a screen 508 on a vent opening 510 comprising the heated surface 512. In addition, the cover 500 is configured to include a vent (e.g., holes 144) to allow flow 126 of air (e.g., natural convection) through the duct 504 from a first side 128 to the second side 130.

Sixth Example

FIG. 6A, FIG. 6B, FIG. 6C, and FIG. 6D illustrate a de-rotation unit 600 mounted on a helicopter 602 and a line of sight blocker 604 including a cover 606 for blocking transmission of infrared radiation generated by the de-rotation unit 600. The helicopter 602 includes a hub 608, the de-rotation unit 600 sitting on a top of the hub 608; and a bearing unit that supports the hub on a mast 614 so that the hub rotates about an exterior of the mast while the mast remains stationary. The hub is configured to attach to rotors 618 that propel the helicopter. Furthermore, the mast houses a drive shaft 620 (in a hollow interior of the mast) so that the drive shaft transfers power from an engine to the rotors via the hub. The drive shaft is attached to the hub via a flange 622 passing over a top of the mast.

The de-rotation unit includes an inner can 624, an outer can 626, bearings 625 between the inner can and the outer can, and a cap 650. The bearings 625 rotate between an inner surface of the outer can and an outer surface of the inner can so as to decouple the rotation of the inner can (that moves with the hub and the drive shaft when the drive shaft 620 is rotating and driving the rotors 618) from the outer can 626, thereby allowing the outer can 626 to remain stationary by coupling the outer can to the stand pipe 615 and coupling the stand pipe 615 to a fixed point on the airframe 602a of the helicopter 602. As a result, one or more components 632 (e.g., radar and/or communications transceivers) mounted on the outer can do not rotate with the drive shaft.

The de-rotation unit further includes seals 634 sealing lubricant for the bearings within the space 660 between the inner can and the outer can. Heat is generated through frictional forces (e.g., from the rotation of the bearings 625 and/or contact of the lubricant with the seals 634). Thus, the de-rotation unit includes a heated surface 636 emitting infrared radiation when the de-rotation unit is in operation.

FIGS. 6A, 6B, 6C and 6D illustrate the line of sight blocker 604 includes the cover 606 disposed over the heated surface 636 so as to block a line of sight to the heated surface. The gap 638 at the bottom and holes 640 at the top allow for the free flow of air. In this arrangement the flow relies on natural convection and the gap provides a path for latent heat from the heated surface to escape out from between the cover and the heated surface.

Process Steps

Figure 7:
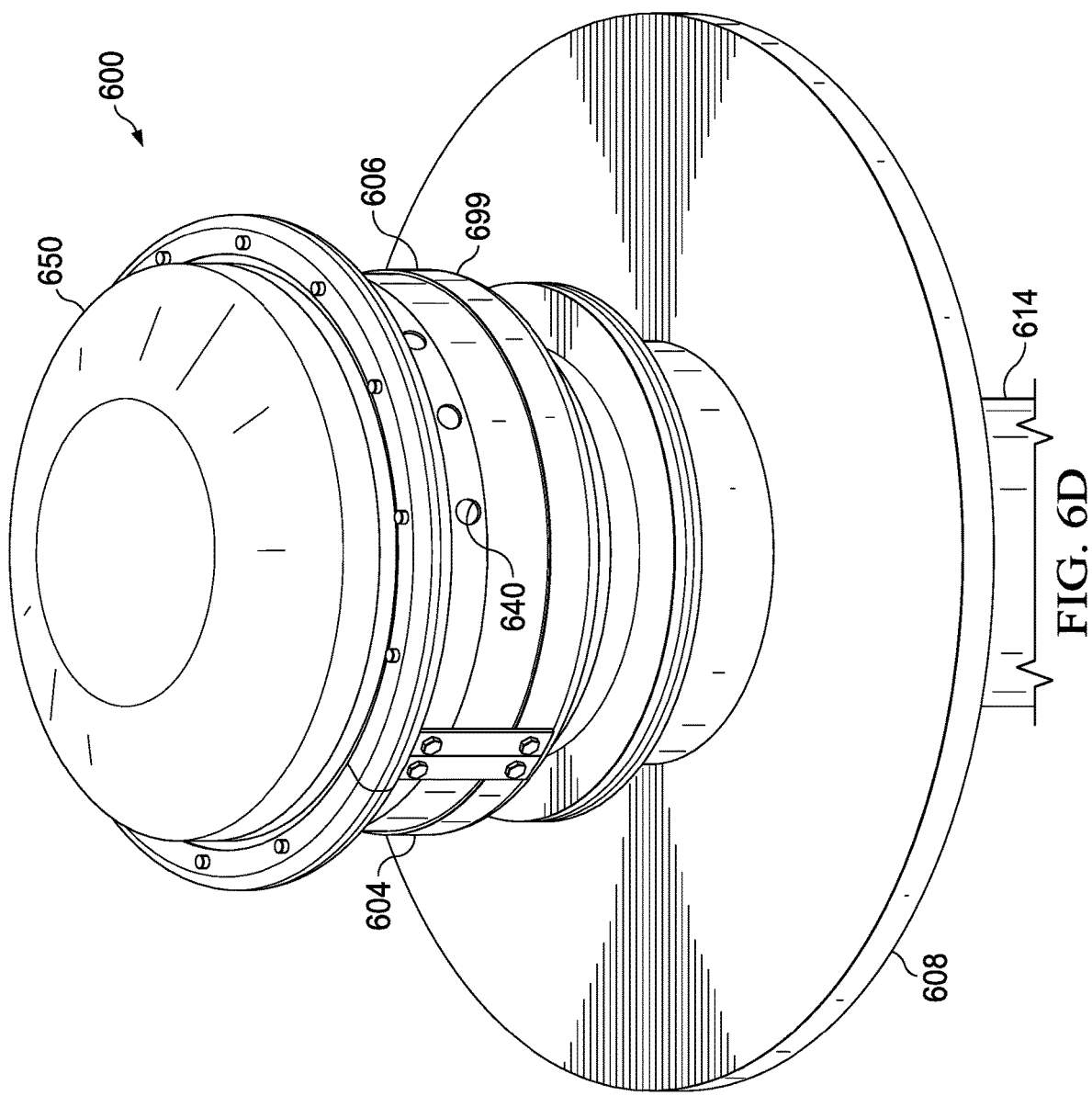
FIG. 7 is a flowchart illustrating a method of making a line of sight blocker.
Figure 7:
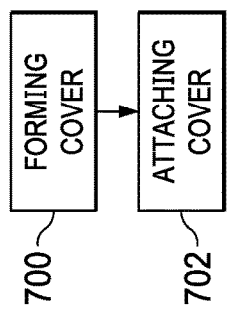

FIG. 7 is a flowchart illustrating a method of making a line of sight blocker.

Block 700 represents shaping or forming a cover. The cover comprises one or more materials having a lower thermal conductivity than the heated surface and a second material having optical properties (e.g., reflectivity, transmittivity, and absorption coefficient) blocking transmission of infrared radiation. Example materials include plastic (e.g., polyetherimide) or carbon fiber materials. The material can comprise a single material having low thermal conductivity and optical properties blocking infrared radiation, or a first material with lower thermal conductivity and a second material having infrared radiation blocking properties.

Block 702 represents attaching or fastening the cover over a heated surface so that the cover defines a duct bounded by the cover and the heated surface when the cover is fastened over a heated surface. The duct comprises a vent and a path for latent heat from the heated surface to escape through the vent.

In one or more examples, the cover comprises a first sidewall of the duct and a part extending outwardly from the first sidewall. The part (integral with the cover or attached to the cover) has a length defining a width of the duct. The part is fastened to the heated surface or a mount supporting the heated surface using a fastener (e.g., nuts, screws, pins, or adhesive).

Example applications include, but are not limited to, using the blocker to shield hot spots on rotorcraft/aircraft to dramatically reduce infra-red signature. Once the major contributors of infra-red generation are addressed at a system level, several smaller heat sources can appear. Examples of these small heat sources include bearings, friction surfaces and seals on dynamic components. The result of installation of the blockier is a low cost, lightweight system that provides reduced infra-red signature and can be retrofitted to existing aircraft as needed.

The blocker is embodied in many ways including, but not limited to, the following.

1. A line of sight blocker, comprising:
a cover (102, 200, 300, 400, 500, 606) defining a duct (104, 202, 306, 504) bounded by the cover (102, 200, 300, 400, 500, 606) and a heated surface (106, 208, 304, 406, 502, 636) when the cover (102, 200, 300, 400, 500, 606) is fastened over the heated surface (106, 208, 304, 406, 502, 636), wherein:
the cover (102, 200, 300, 400, 500, 606) blocks transmission of infrared radiation (108) emitted from the heated surface (106, 208, 304, 406, 502, 636);

the cover (102, 200, 300, 400, 500, 606) comprises a material having a lower thermal conductivity than the heated surface (106, 208, 304, 406, 502, 636); and the duct (104, 202, 306, 504) comprises a vent (114) and a path (116) for latent heat (118a) from the heated surface (106, 208, 304, 406, 502, 636) to escape through the vent (114).

2. The blocker of example 1, wherein the duct (104, 202, 306, 504) comprises air (120) forming an insulation layer (122).

3. The blocker of example 1, further comprising:
a part (132) extending outward from a first sidewall, wherein:
the cover (102, 200, 300, 400, 500, 606) comprises the first sidewall (110) and a second sidewall (112); and
the part (132) has a length defining a width (W) of the duct (104, 202, 306, 504), the width (W) comprising a spacing between the first sidewall (110) and the heated surface (106, 208, 304, 406, 502, 636) when the first sidewall (110) is facing the heated surface (106, 208, 304, 406, 502, 636) and the part (132) is physically connected to the heated surface (106, 208, 304, 406, 502, 636).

4. The blocker of example 3, wherein the duct (104, 202, 306, 504) has the width (W) wherein ⅜ inch≤W≤1 inch.

5. The blocker of example 3, wherein the duct (104, 202, 306, 504) has the width (W) allowing a flow (126) of air (120) into the duct (104, 202, 306, 504) through natural convection.

6. The blocker of example 3, wherein the cover (102, 200, 300, 400, 500, 606) includes the part (132) comprising a top wall (134), a flange (136), a lip (138), a rim (140), or an arm (142).

7. The blocker of example 6, wherein the top wall (134) includes a plurality of holes (144, 640) allowing flow (126) of air (120) out of the duct (104, 202, 306, 504).

8. The blocker of example 1, wherein the cover (200, 300) is conformal with the heated surface (208, 304).

9. The blocker of example 1, wherein the cover (200) has a first circular cross-section (218), the heated surface (208) has a second circular cross section (218), and the cover (200) is co-axial with the heated surface (208) when the cover (200) is fastened over the heated surface (208). In one or more examples, the cover (200) comprises a segment (299a) of a circle (e.g., the cover comprises a half cylinder) to effectively block emissions about a section (e.g., half) of the heated surface (208), as illustrated in FIG. 2B.

10. The blocker of example 1, wherein the cover (200, 500) is conformal with the heated surface (208, 502) and defines the duct (202, 504) when fastened to a device (204, 506):
including an engine drain line (212) having the heated surface (208),
a hydraulic line (210) having the heated surface (208), or
a screen (508) on a vent opening (510) comprising the heated surface (502).

11. The blocker of example 1, wherein the cover (400) is conformal with the heated surface (304) and defines the duct (306) when fastened:
to an electronic circuit (308) including the heated surface (304), or
a box (310) housing the electronic circuit (308) and the box (310) includes the heated surface (304).

12. The blocker of example 1, wherein the cover (400, 606) defines the duct (104) when fastened to a bearing unit (400) comprising a housing (402) including bearings (404), the housing (402) including the heated surface (406, 636).

13. An apparatus, comprising:
a device (204, 506) including a heated surface (106, 208, 304, 406, 502, 636) emitting infrared radiation (108) when the device (204, 506) is in operation;
a cover (102, 200, 300, 400, 500, 606) disposed over the heated surface (106, 208, 304, 406, 502, 636); and
a gap (638) between the cover (102, 200, 300, 400, 500, 606) and the heated surface (106, 208, 304, 406, 502, 636), wherein the gap (638) comprises a path (116) for latent heat (118a) from the heated surface (106, 208, 304, 406, 502, 636) to escape from between the cover (102, 200, 300, 400, 500, 606) and the heated surface (106, 208, 304, 406, 502, 636).

14. The device (204, 506) of example 13, further comprising a fan coupled to the gap (638), the fan blowing cooling air (120) into the gap (638).

15. The device (204, 506) of example 13, wherein the cover (102, 200, 300, 400, 500, 606) is retrofittably disposed over the heated surface (106, 208, 304, 406, 502, 636) (e.g., the cover is disposed as a retrofit or is retrofitted the aircraft).

16. The device (204, 506) of example 13, wherein the cover (102, 200, 300, 400, 500, 606) is conformal with the heated surface (106, 208, 304, 406, 502, 636) and defines a duct (104, 202, 306, 504) when fastened to the device (204, 506) including:
an engine drain line (212) having the heated surface (208),
a hydraulic line (210) having the heated surface (208),
an electronic circuit (308) including the heated surface (304), or
a box (310) housing the electronic circuit (308) and the box (310) includes the heated surface (304).

17. The device (204, 506) of example 13, wherein the device (204, 506) comprises a first surface and a second surface, the second surface frictionally engaging the first surface during the operation so as to heat (118) the first surface into the heated surface through friction.

18. The device (204, 506) of example 13, further comprising a duct (104, 202, 306, 504) bounded by the cover (102, 200, 300, 400, 500, 606) and the heated surface (106, 208, 304, 406, 502, 636), the duct (104, 202, 306, 504) having the gap (638) at a first end of the cover (102, 200, 300, 400, 500, 606) and a second opening at a second end of the cover (102, 200, 300, 400, 500, 606), wherein the path (116) through the duct (104, 202, 306, 504) is perpendicular to a line of sight through the cover (102, 200, 300, 400, 500, 606) to the heated surface (106, 208, 304, 406, 502, 636).

19. The device (204, 506) of example 13, wherein:
the apparatus comprises a de-rotation unit (600) including an inner can (624), an outer can (626), and bearings (625) between the inner can (624) and the outer can (626),
wherein:
the bearings (625) rotate so as to decouple a rotation of the inner can (624) from the outer can (626) when the outer can (622) is coupled to a stand pipe (615) and the stand pipe (615) is coupled to a fixed point on an airframe (602a), so that one or more components (632) mounted on the outer can (626) do not rotate with the inner can (624), and
the de-rotation unit (600) further includes seals (634) sealing lubricant within a space (660) between the inner can and the outer can; and
the de-rotation unit (600) includes the heated surface (636) emitting infrared radiation (108) when the de-rotation unit (600) is decoupling rotation of the outer can (626) from the rotation of the inner can (624) with a drive shaft (620) driving a plurality of rotors (618) on a helicopter (602) having the airframe (602a).

20. The device of example 19, wherein the cover having a circular cross-section is conformal and coaxial with the heated surface having a circular cross-section.

21. The duct bounded by the cover and the heated surface, the duct having the gap at a first end of the cover and a second opening at a second end of the cover, wherein the path through the duct is perpendicular to a line of sight through the cover to the heated surface.

22. An apparatus comprising:
a shroud (699) that removably and retrofittably couples to a mast (614), wherein the shroud (699) is sized and shaped to draw air (120) in a gap (638) between the shroud (699) and the mast (614), and
the gap (638) forms an insulation layer (122) and provides a path (116) for latent heat (118*a*) from the mast (614) to escape.

23. A shroud retrofittable over a portion of the mast that draws air to and through mast. The shroud defines a gap between the shroud and the mast with a vent at the bottom that is open to the bottom. Air is drawn in through the vent, then traverses the gap, and exits through a series of strategically placed holes at a top.

Advantages and Improvements

Current infra-red reduction technology is normally implemented in the early design phase and handled at the system level. This approach makes current solutions difficult and expensive to retrofit on existing platforms. Example blockers disclosed herein provide a cost effective and lightweight solution to infra-red reduction on existing platforms by retrofit. The blocker is highly adaptable to other platforms and has far reaching applications.

CONCLUSION

This concludes the description of the preferred embodiment of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A line of sight blocker, comprising:
a cover defining a duct bounded by the cover and a heated surface when the cover is fastened over the heated surface, wherein:
the duct comprises a first sidewall and a second sidewall,
the cover comprises the first sidewall and the second sidewall comprises the heated surface,
the duct comprises a width comprising a spacing between the first sidewall and the heated surface when the first sidewall is facing the heated surface, the cover blocks transmission of infrared radiation emitted from the heated surface,
the cover comprises a material having a lower thermal conductivity than the heated surface, and
the duct comprises a vent and a path for heat from the heated surface to escape through the vent.

2. The line of sight blocker of claim 1, wherein the duct comprises air forming an insulation layer and the cover comprises one or more materials including plastic or carbon fiber.

3. The line of sight blocker of claim 1, further comprising:
a part extending outward from the first sidewall, wherein the part has a length defining the width of the duct.

4. The line of sight blocker of claim 3, wherein the duct has the width (W) wherein $\frac{3}{8}$ inch $\leq W \leq 1$ inch.

5. The line of sight blocker of claim 3, wherein the duct has the width allowing a flow of air into the duct through natural convection.

6. The line of sight blocker of claim 3, wherein the cover includes the part comprising a top wall, a flange, a lip, a rim, or an arm.

7. The line of sight blocker of claim 6, wherein the top wall includes a plurality of holes allowing flow of air out of the duct.

8. The line of sight blocker of claim 1, wherein the cover is conformal with the heated surface.

9. The line of sight blocker of claim 1, wherein the cover has a first circular cross-section or a cross-section including a segment of a circle, the heated surface has a second circular cross-section, and the cover is co-axial with the heated surface when the cover is fastened over the heated surface.

10. The line of sight blocker of claim 1, wherein the cover is conformal with the heated surface and defines the duct when fastened to a device:
including an engine drain line having the heated surface,
a hydraulic line having the heated surface, or
a screen on a device vent having the heated surface.

11. The line of sight blocker of claim 1, wherein the cover is conformal with the heated surface and defines the duct when fastened:
to an electronic circuit including the heated surface, or
a box housing the electronic circuit and the box includes the heated surface.

12. The line of sight blocker of claim 1, wherein the cover defines the duct when fastened to a housing including bearings, the housing including the heated surface.

13. An apparatus, comprising:
a device including a heated surface emitting infrared radiation when the device is in operation;
a cover disposed over the heated surface; and
a gap between the cover and the heated surface, wherein the gap comprises a path for latent heat from the heated surface to escape from between the cover and the heated surface, wherein:
the cover is conformal with the heated surface and defines a duct when fastened to the device including an engine drain line having the heated surface, a hydraulic line having the heated surface, an electronic circuit including the heated surface, or a box housing the electronic circuit and the box includes the heated surface; or
the device comprises a first surface and a second surface, the second surface frictionally engaging the first surface during the operation so as to heat the first surface into the heated surface through friction, or
the apparatus comprises a de-rotation unit including the heated surface, an inner can, an outer can, and bearings between the inner can and the outer can.

14. The device of claim 13, further comprising a fan coupled to the gap, the fan blowing air into the gap.

15. The device of claim 13, wherein the cover is retrofittably disposed over the heated surface.

16. The device of claim 13, wherein the cover is conformal with the heated surface and defines the duct when fastened to the device including:
the engine drain line having the heated surface,
the hydraulic line having the heated surface,
the electronic circuit including the heated surface, or the box housing the electronic circuit and the box includes the heated surface.

17. The device of claim 13, wherein the device comprises the first surface and the second surface, the second surface frictionally engaging the first surface during the operation so as to heat the first surface into the heated surface through the friction.

18. The device of claim 13, further comprising the duct bounded by the cover and the heated surface, the duct having the gap at a first end of the cover and a second opening at a second end of the cover, wherein the path through the duct is perpendicular to a line of sight through the cover to the heated surface.

19. The device of claim 13, wherein:
the apparatus comprises the de-rotation unit including the inner can, the outer can, and the bearings between the inner can and the outer can,
wherein:
the bearings rotate so as to decouple a rotation of the inner can from the outer can when the outer can is coupled to a stand pipe and the stand pipe is coupled to a fixed point, so that one or more components mounted on the outer can do not rotate with the inner can;
the de-rotation unit further includes seals sealing lubricant within a space between the inner can and the outer can; and
the de-rotation unit includes the heated surface emitting infrared radiation when the de-rotation unit is decoupling the rotation of the outer can from the rotation of the inner can with a drive shaft driving a plurality of rotors on a helicopter.

20. An apparatus comprising:
a shroud that removably and retrofittably couples to a mast, wherein the shroud is sized and shaped to draw air in a gap between the shroud and the mast, and
the gap forms an insulation layer and provides a path for latent heat from the mast to escape.

* * * * *